(12) United States Patent
Ast

(10) Patent No.: US 10,832,048 B2
(45) Date of Patent: Nov. 10, 2020

(54) SYSTEMS AND METHODS FOR GENERATING AND USING SEMANTIC IMAGES IN DEEP LEARNING FOR CLASSIFICATION AND DATA EXTRACTION

(71) Applicant: OPEN TEXT SA ULC, Halifax (CA)

(72) Inventor: Uwe Ast, Constance (DE)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 16/842,097

(22) Filed: Apr. 7, 2020

(65) Prior Publication Data

US 2020/0242348 A1    Jul. 30, 2020

Related U.S. Application Data

(63) Continuation of application No. 16/058,476, filed on Aug. 8, 2018, now Pat. No. 10,628,668.

(Continued)

(51) Int. Cl.
*G06K 9/00* (2006.01)
*G06N 5/04* (2006.01)
(Continued)

(52) U.S. Cl.
CPC ......... *G06K 9/00463* (2013.01); *G06F 40/30* (2020.01); *G06K 9/00442* (2013.01);
(Continued)

(58) Field of Classification Search
CPC ........... G06K 9/00463; G06K 9/00442; G06K 9/6267; G06K 9/00469; G06K 9/00456;
(Continued)

(56) References Cited

U.S. PATENT DOCUMENTS

2008/0170786 A1*  7/2008  Tomizawa ............. G06K 9/033
                                                   382/176
2018/0204360 A1*  7/2018  Bekas ...................... G06N 5/02

OTHER PUBLICATIONS

Noce, "Document Image Classification Combining Textual and Visual Features," 2016, Ph.D. Thesis, University of Insubria (Year: 2006).*

(Continued)

*Primary Examiner* — Said M Elnoubi
(74) *Attorney, Agent, or Firm* — Sprinkle IP Law Group

(57) ABSTRACT

Disclosed is a new document processing solution that combines the powers of machine learning and deep learning and leverages the knowledge of a knowledge base. Textual information in an input image of a document can be converted to semantic information utilizing the knowledge base. A semantic image can then be generated utilizing the semantic information and geometries of the textual information. The semantic information can be coded by semantic type determined utilizing the knowledge base and positioned in the semantic image utilizing the geometries of the textual information. A region-based convolutional neural network (R-CNN) can be trained to extract regions from the semantic image utilizing the coded semantic information and the geometries. The regions can be mapped to the textual information for classification/data extraction. With semantic images, the number of samples and time needed to train the R-CNN for document processing can be significantly reduced.

20 Claims, 11 Drawing Sheets

Related U.S. Application Data

(60) Provisional application No. 62/543,246, filed on Aug. 9, 2017.

(51) Int. Cl.
    *G06N 3/08*     (2006.01)
    *G06N 20/00*     (2019.01)
    *G06N 3/04*     (2006.01)
    *G06F 40/30*     (2020.01)
    *G06K 9/62*     (2006.01)
    *G06N 5/02*     (2006.01)

(52) U.S. Cl.
    CPC ..... *G06K 9/00456* (2013.01); *G06K 9/00469* (2013.01); *G06K 9/6267* (2013.01); *G06N 3/0427* (2013.01); *G06N 3/0454* (2013.01); *G06N 3/08* (2013.01); *G06N 5/046* (2013.01); *G06N 20/00* (2019.01); *G06K 2209/01* (2013.01); *G06N 5/022* (2013.01)

(58) Field of Classification Search
    CPC .. G06K 2209/01; G06N 3/0454; G06N 20/00; G06N 3/0427; G06N 5/046; G06N 3/08; G06N 5/022; G06F 40/30
    See application file for complete search history.

(56) References Cited

OTHER PUBLICATIONS

Yang et al. Learning to Extract Semantic Structure from Documents Using Multimodal Fully Convolutional Neural Network, 2017, arXiv.org, Cornell University (Year: 2017).*

Ren et al., "Faster R-CNN" Towards Real-Time Object Detection with Region Proposal Networks, arXiv:1506.01497v3 [cs.CV] Jan. 6, 2016, [retrieved from <<https://arxiv.org/pdf/1506.01497.pdf>> on Oct. 2, 2018]14 pages.

Notice of Allowance issued for U.S. Appl. No. 16/058,476, dated Dec. 16, 2019, 10 pages.

Noce, "Document Image Classification Combining Textual and Visual Features," PhD Thesis, University of Insubria, 2016, 74 pages.

Yang, et al., "Learning to Extract Serntantic Structure frorn Docurnents Using Multirnodal Fully Convolutional Neural Network," <<arXiv.org>> Cornell University, 2017, 16 pages.

* cited by examiner

INVOICE

| | PURCHASE ORDER NUMBER | INVOICE DATE | INVOICE NUMBER |
|---|---|---|---|
| INVOICE | 13333333 | 11/11/11 | 03-030 |

BILL TO:  SHIP To:

DT GmbH
Max-Stromeyer-Straße 1111
D-78484 Konstanz/Germany

| Pos | Qty | Unit | Description | Unit Price | Disc | Value |
|---|---|---|---|---|---|---|
| | | | Packing Slip : 29170 | | | |
| 20 | 1000 | EA | PB 29170 SCISSORS PB 2917 PWA Assembly | 29.17 | | 29170.00 |
| 30 | 1000 | EA | PB 29170 TOOLBOX D - COMB & MCD (CH) | 13.49 | | 13490.00 |
| 40 | 560 | EA | PB 29170 STEEL PB 2917A PWA Assembly | 18.96 | | 10617.60 |
| | | | Packing Slip : 29170 | | | |
| 40 | 440 | EA | PB 9950A BARN PB 2917 A PWA Assembly | 18.96 | | 8342.40 |

Sub Total 61620.00
VAT 17.5 % 10783.50
Total GBP 72403.50

| | PURCHASE ORDER NUMBER | INVOICE DATE | INVOICE NUMBER |
|---|---|---|---|
| INVOICE | 13333333 | 11/11/11 | 03-030 |

BILL TO:      SHIP To:

DT GmbH
Max-Stromeyer-Straße 1111
D-78484 Konstanz/Germany

| Pos | Qty | Unit | Description | Unit Price | Disc | Value |
|---|---|---|---|---|---|---|
| Packing Slip : 29170 | | | | | | |
| 20 | 1000 | EA | PB 29170 SCISSORS PB 2917 PWA Assembly | 29.17 | | 29170.00 |
| 30 | 1000 | EA | PB 29170 TOOLBOX D-COMB & MCD (CH) | 13.49 | | 13490.00 |
| 40 | 560 | EA | PB 29170 STEEL PB 2917 A PWA Assembly | 18.96 | | 10617.60 |
| Packing Slip : 29170 | | | | | | |
| 40 | 440 | EA | PB 9950 A BARN PB 2917 A PWA Assembly | 18.96 | | 8342.40 |

Sub Total    61620.00
VAT 17.5 %    10783.50
Total GBP    72403.50

SYSTEMS AND METHODS FOR GENERATING AND USING SEMANTIC IMAGES IN DEEP LEARNING FOR CLASSIFICATION AND DATA EXTRACTION

CROSS-REFERENCE TO RELATED APPLICATIONS

This application is a continuation of, and claims a benefit of priority under 35 U.S.C. 120 from, U.S. patent application Ser. No. 16/058,476, filed Aug. 8, 2018, entitled "SYSTEMS AND METHODS FOR GENERATING AND USING SEMANTIC IMAGES IN DEEP LEARNING FOR CLASSIFICATION AND DATA EXTRACTION," issued as U.S. Pat. No. 10,628,668, which claims a benefit of priority under 35 U.S.C. § 119(e) from U.S. Provisional Application No. 62/543,246, filed Aug. 9, 2017, entitled "SYSTEMS AND METHODS FOR GENERATING AND USING SEMANTIC IMAGE." All applications listed in this paragraph are fully incorporated by reference herein for all purposes.

TECHNICAL FIELD

This disclosure relates generally to document processing utilizing machine learning. More particularly, this disclosure relates to systems and methods for generating semantic images from input images of documents and utilizing the semantic images to improve the training and performance of a machine learning engine for classification and data extraction.

BACKGROUND OF THE RELATED ART

It is often necessary for companies to extract information from various types of documents such as invoices, purchase orders, correspondences, etc., and to enter this information in their own data systems so that they can use the information for various enterprise operations and processes. While the process of extracting document information, converting the extracted document information into a computer-usable form and entering the converted information into a data processing system was historically performed manually, computer-based systems have been developed to automate this process. Computer-based systems are available, for example, to perform optical character recognition (OCR) on images of scanned documents and to thereby generate digital data from the images. The strings of recognized characters can be processed according to a predetermined set of algorithms to identify information that is represented by the character strings. OCR techniques are known to those skilled in the art and thus are not further described herein.

While automated data extraction systems can reduce the burden of having to manually identify and re-enter the information that is found in business documents, these systems still have some drawbacks. For instance, traditionally, it has been necessary to program these systems with an extensive set of rules that are used to determine the type of information that is represented by a particular string of characters. For example, a rule may be needed to determine that a character string "New York" represents a city name, or a rule may be needed to determine that a character string "Smith" represents a person's surname. This programming requires a great deal of time and effort, and any exception to the predefined rules may "break" the algorithm and require special handling. In addition to the high cost of programming these systems, it is usually necessary to perform manual validation of the results generated by the systems, which further increases the cost.

SUMMARY OF THE DISCLOSURE

Embodiments disclosed herein can address the aforementioned drawbacks and provide additional technical solutions and benefits. These embodiments advantageously leverage the power of deep learning (DL) to improve the performance of machine learning (ML) engines for classification and data extraction from document images, and to reduce or eliminate the programming that was previously required to implement traditional algorithmic rules used in training ML engines. The incorporation of deep learning enables a ML engine to learn and classify/extract by examples, rather than by rules. While training a ML engine usually requires a large number of training samples and a great deal of training time, embodiments disclosed herein make use of semantic images to facilitate the training and the performance of the ML engine in classification and data extraction tasks.

In some embodiments, a method for generating and using semantic images may include receiving an input image of a document, generating textual information with geometries from the input image, converting the textual information with geometries to semantic information, generating a semantic image coded with the semantic information, extracting regions from the semantic image through a ML engine enhanced with a DL feedback loop, and extracting data from the regions provided by the ML engine. The method can be implemented on a server computer operating in an enterprise computing environment. The server computer can be part of an enterprise system. Such an enterprise system can be capable of capturing documents and data from paper, electronic files, and other sources, transforming the captured documents and data into digital content, and communicating the transformed digital content to downstream computing facility or facilities, for instance, content management systems, enterprise operations and processes, and so on.

In some embodiments, text with geometries can be generated from an input image of a document by an OCR module. In some embodiments, the input image may already have text with geometries when received by a system implementing the method. In such cases, the method can proceed to convert the text bounded by the geometries (e.g., bounding boxes, rectangles, frames, etc.) to semantic information.

In some embodiments, the system includes a semantics converter module configured for converting the text to semantic information (i.e., the meaning or semantic type of the text) utilizing a language knowledge base. For example, the semantics converter module is operable to determine that a piece of text bounded by a geometry contains a text string "July". The semantics converter module can access and search the language knowledge base for information on "July" and determine that the semantic type of "July" is "month". Rather than extracting the actual content of the text string "July", the semantics converter module is operable to determine a code for the text string based on its semantic type "month".

Any coding schemes suitable for identifying different semantic types can be used. "Coding", in this sense, can include finding, from the language knowledge base, a data type or semantic type associated with the text under evaluation and writing, for instance, a set of pixels corresponding to the text under evaluation in a certain code or color that corresponds to the semantic type. For example, the semantic type "month" may be coded as "1" or "yellow" with a set of x-y coordinates (relative to the document); the semantic type "day" may be coded as "2" or "red" with another set of x-y coordinates; the semantic type "year" may be coded as "3" or "orange" with yet another set of x-y coordinates; and so on. The finding can be done utilizing a dictionary or reverse index of the language knowledge base and the pixel writing can be done utilizing a painting tool, facility, or module. The number of semantic types corresponds to the number of semantic layers in an output semantic image. For example, if there are four semantic types, there can be four colors or codes, indicating four semantic layers in an output semantic image. Codes in the programming sense (as opposed to colors for visualization by humans) can be handled more efficiently by algorithms.

In some embodiments, the semantics converter module is further operable to generate a semantic image based on the semantic types that can be determined from the input image. In this disclosure, a "semantic image" refers to an image of a document that is coded with the semantic information of the document without any textual content of the document. Such a semantic image has the location information where the semantic information can be found on the document and has codes corresponding to the semantic information by type.

In some embodiments, the semantic image may be provided as input to a ML engine implementing a specifically trained artificial neural network (ANN). In some embodiments, the ML engine implements a region-based convolutional neural network (R-CNN) and operates as an R-CNN runtime engine.

In some embodiments, the R-CNN runtime engine is operable to process the semantic image and extract regions from the semantic image for text mapping. For instance, responsive to "month", "day", and "year" being found in close proximity to each other in the semantic image (based on the associated location information such as x-y coordinates), the R-CNN runtime engine can identify them as a region for a date. As another example, responsive to certain semantic types (e.g., "number", "street", "city, state", and "zip code") being found in close proximity to each other, the R-CNN runtime engine can identify them as a region for an address. Here, "date" and "address" are examples of data fields that can be processed by a text mapping module downstream from the R-CNN runtime engine.

In some embodiments, processing outputs from the R-CNN runtime engine are provided to a DL feedback loop. The DL feedback loop includes a training process that can update/improve a field type knowledge base which is utilized by a DL learner. The DL learner learns how to look for regions in semantic images and produces R-CNN parameters (e.g., minimum error, number of neurons, etc.). The R-CNN parameters can then be fed back to the R-CNN runtime engine to improve its performance and outputs.

In some embodiments, a text mapping module is operable to utilize the regions outputted by the R-CNN runtime engine and the text with geometries from the input image to identify, classify, and/or extract desired information from the document. For example, responsive to receiving an input image of an invoice, the system can quickly, intelligently, and automatically identify semantic types such as "street", "city", "state", "month", "day", "year", "number", etc. contained in the invoice, generate a semantic image of the invoice coded with the semantic types, identify and extract regions such as "address", "invoice date", "invoice number", "purchase order number", "table header", "table body", and "invoice totals" from the semantic image, and extract data from each region for a corresponding data field. In this way, the system can understand the unstructured information contained in the input image and intelligently transform the unstructured information into structured data that can be consumed by a downstream computing facility or facilities.

Identifying semantic information by their respective semantic types allows different types of semantic information be treated in the same way. For example, states "Texas", "TX", "New Mexico", "NM", "California", "CA", "New York", "NY", and character strings corresponding to all the other states can be classified by the single semantic type "state name" and given a single code for the semantic type in a semantic image. Likewise, different addresses can be coded to the same semantic type "address" and different variants of "month", "day", "year" (e.g., "Jul. 31, 2018", "31 Jul. 2018", "07/31/2018", "7/31/18", etc.) can be coded to the same semantic type "date". In this way, the R-CNN does not need to be trained to handle all the detailed textual information, such as all the street numbers, street names, cities, states, and zip codes and their variants, all the "year", "month", "day" and their variants, and so on, in input images. Instead, the R-CNN can be trained to recognize regions, which correspond to desired fields such as "state name", "address", "date", etc., from semantic images. Since the R-CNN does not need to be trained to handle all the detailed textual information, the number of samples and the time and computational costs needed for training the R-CNN can be significantly reduced.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 8A-8E depicts a diagrammatic representation of the transformation of an input image to a semantic image with machine-learned regions for text mapping according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
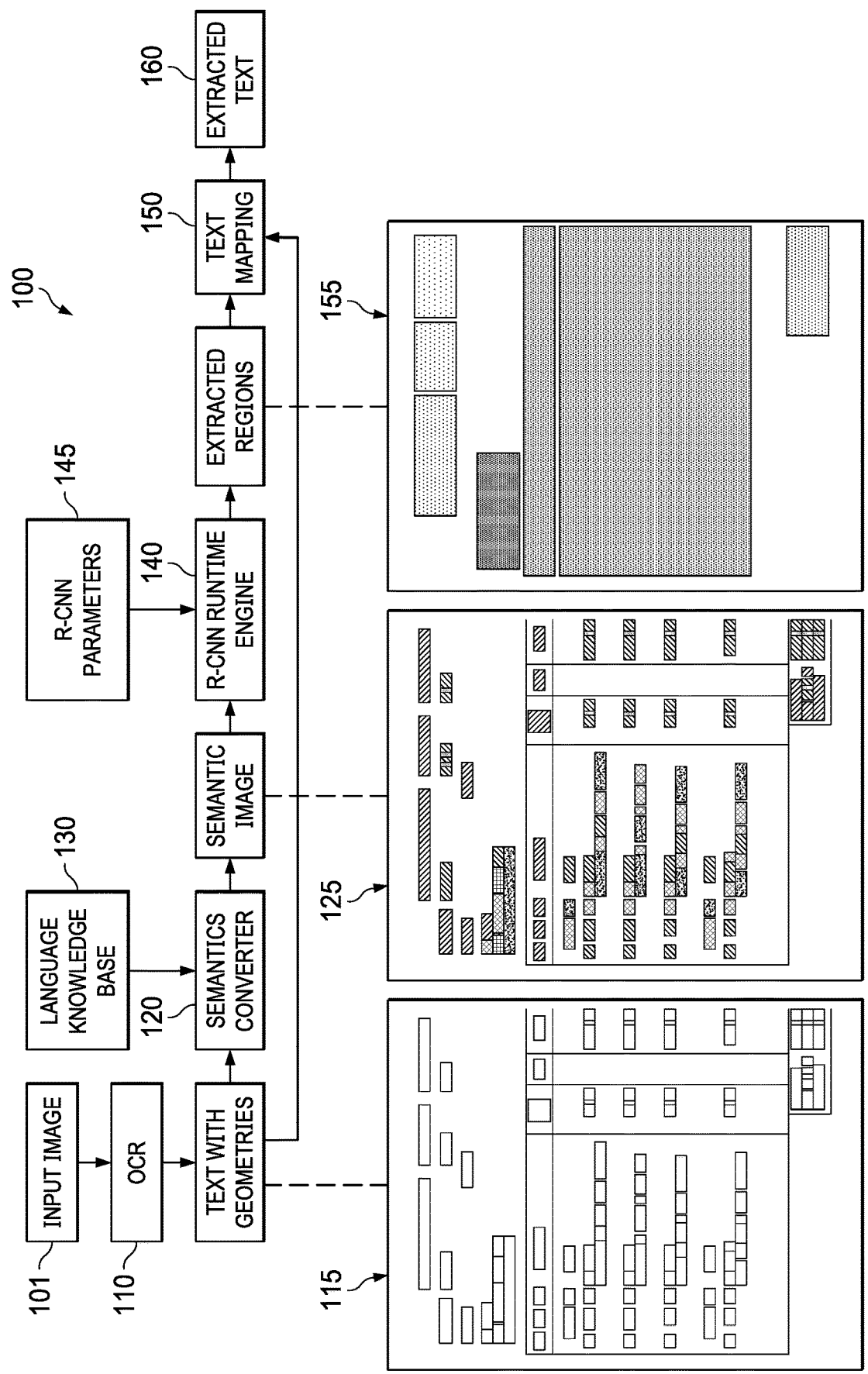
FIG. 1 depicts a diagrammatic representation of a data classification and extraction system according to some embodiments.

Referring to FIG. 1, a diagrammatic representation of a data classification and extraction system 100 according to some embodiments is shown. As depicted in FIG. 1, system 100 can include an OCR module 110, a semantics converter module 120, a language knowledge base module 130, and an R-CNN run time engine 140.

An input image 101 can be provided to or received by OCR module 110. OCR module 110 is configured for identifying characters that are depicted within input image 101 and producing an output 115 that includes the identified characters and corresponding geometries. As used herein, "geometries" refers to the position information associated with the characters. The position information identifies where particular characters are found in the image. As illustrated in FIG. 1, the position information can be represented in output 115 as bounding boxes, frames, rectangles, or the like. Output 115 can be a text document that contains the text of the input image and corresponding position information. When input image 101 already contains such a text document, the OCR operation performed by OCR module 110 can be skipped.

In some embodiments, the text document can be provided by OCR module 110 to semantics converter module 120. In some embodiments, the text document can be provided to semantics converter module 120 through means other than an OCR system.

In some embodiments, semantics converter module 120 is configured for identifying semantic types associated with semantic information in the text document. In some embodiments, semantics converter module 120 does so by accessing language knowledge base module 130 using any suitable look-up method (e.g., through an inverted index, reverse index, dictionary, etc.).

Figure 2:
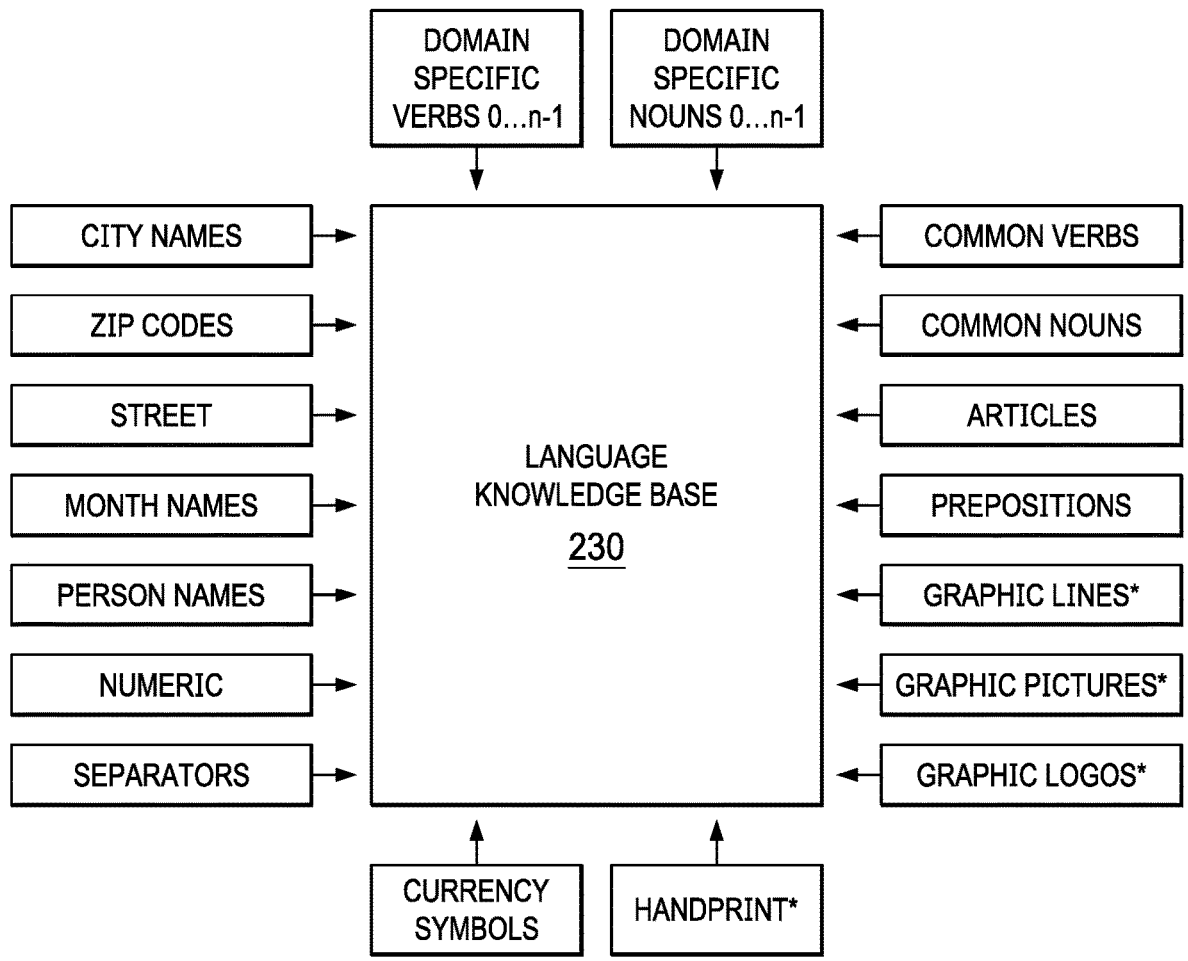
FIG. 2 depicts a diagrammatic representation of a language knowledge base according to some embodiments.

Referring to FIG. 2, a diagrammatic representation of the information that may be contained in a language knowledge base 230 according to some embodiments is shown. Language knowledge base 230 can include information identifying various different semantic types that may be associated with text found in an image. These semantic types may include, for example, common nouns, common verbs, city names, zip codes, streets, month names, person names, numbers, separators, currency symbols, articles, prepositions, and the like. These types of text may be found in almost any document image. "*" denotes non-text types that may be supported by an OCR engine.

Initially, lists of possible values (e.g., character strings) for each semantic type can be entered into language knowledge base 230. Over time, language knowledge base 230 can be augmented with additional entries, for instance, automatically as the system is trained and used.

In some embodiments, language knowledge base 230 can include semantic types that are specific to a particular use or user, such as domain-specific nouns and domain-specific verbs. This allows a semantics converter (e.g., semantics converter module 120) to identify semantic types associated with text that is not usually found in typical enterprise documents. For instance, an enterprise may use certain terminology or acronyms that are not typically used by other enterprises, and whose semantic type(s) might be unclear outside the context of the enterprise or the industry of which the enterprise is in. The entries in a language knowledge base for domain-specific semantic types may be supplemented by manually adding these entries to the language knowledge base, or through training and using the system. In some embodiments, language knowledge base 230 can be configured to include non-textual semantic types such as graphics (e.g., lines, pictures, logos, etc.), layouts, signatures, handprints, etc.

Referring to FIG. 1, language knowledge base 130 can implement an embodiment of language knowledge base 230. In operation of system 100, semantics converter module 120 can look up individual pieces of the text (i.e., character strings in the text document) in language knowledge base module 130 and determine from language knowledge base module 130 which semantic type is associated with each piece of the text. For instance, "Smith", "Jones", "Mary", and the like may be associated with the semantic type "person name". Similarly, "Texas", "Vermont", "Colorado", etc. may be associated with the semantic type "state name"; "-", "|" and other characters may be associated with the semantic type "separator"; and so on. In some embodiments, semantic types can be associated with non-textual information such as layout information and/or graphics (e.g., lines, pictures, logos, etc.) in additional to textural information.

In some embodiments, the semantic types in the text document can be represented in a non-textual manner using a coding scheme. For example, suppose text strings such as "John Smith", "Austin", "Texas", "512", "music", "the", "-", and "!" are determined by semantics converter module 120 as having semantic types "name", "city", "state", "area code", "keyword", "article", "separator", and "punctuation". Rather than extracting the actual content of the text strings, semantics converter module 120 is operable to determine a code for each text string by its semantic type. For example, "name" may be coded as "1" or "yellow" with a set of x-y coordinates (relative to the document); "city" may be coded as "2" or "blue" with another set of x-y coordinates; "state"

may be coded as "3" or "purple" with yet another set of x-y coordinates; and so on. Other coding schemes suitable for identifying semantic information by type may also be used.

Semantics converter module 120 can generate a semantic image 125 with the coded semantic information. As illustrated in FIG. 1, semantics converter module 120 can utilize the position information (e.g., geometric coordinates) of the text strings in the text document to position, in semantic image 125, the coded semantic information determined from the text strings. However, semantics converter module 120 does not include the actual content of the text document or the semantic types derived from the text document in semantic image 125. For example, when a color coding scheme is utilized to code semantic information, semantic image 125 can include blocks of colors, each color representing a coded semantic type derived from the text document. In this example, semantic image 125 does not have any textual information. A semantic image can be, but is not required to be, a pixel image. In this disclosure, a semantic image refers to an image that contains coded semantic information (e.g., represented in blocks) corresponding to associated semantic types and geometrics of text in an original document from which the semantic image is generated.

As illustrated in FIG. 1, semantic image 125 generated by semantics converter module 120 is provided as input to an R-CNN runtime engine 140. In some embodiments, R-CNN runtime engine 140 can be a ML engine that implements an R-CNN with a DL feedback loop that produces R-CNN parameters 145. Before describing R-CNN runtime engine 140 in detail, an overview of ML, DL, and CNN might be helpful.

ML and DL are artificial intelligence (AI) learning methods, with DL being a subfield of ML. A ML engine uses algorithms to parse data, learn from the parsed data, and make informed decisions based on what it has learned. An algorithm can have algorithmic rules but is not a complete computer program with a set of instructions that can be translated or executed by a processor. Rather, an algorithm is a limited sequence of steps for solving a problem such as document processing. For instance, a ML engine can be trained to parse text from a document and determine a specific document class and/or extract specific fields like addresses, dates, amounts, etc. based on what it has learned from the text. This process, however, requires that the ML engine be trained to recognize each piece of text in the document and all the possible variants of the piece of text.

For example, to recognize a piece of text "Jul. 31, 2018", the ML engine would need to be trained to recognize "July" out of all twelve months, "31" out of all possible days in a month, and "2018" out of a range of years. Even when the range of years is limited to 200 and considering only two separators: " " and ",", the ML engine would need to be trained to recognize 148,000 combinations. The number of training samples can increase significantly when considering additional separators (e.g., ".", "/", "|", etc.) and/or formats (e.g., "7", "july", "07", "7$^{th}$", "7th", etc.). Because the ML engine can break down a problem into parts, solve each part in order, and then combine the solved parts to create an answer to the problem, it does not require powerful processors and can run on low-end computing devices.

DL utilizes a different approach. Unlike standard ML algorithms that break problems down into parts and solve them individually, DL solves each problem from beginning to end and thus requires high-end machines with graphics cards capable of crunching numbers (e.g., graphic processors or processing units) at a high speed. Much like how human brains work, the more data is fed to a DL algorithm, the better it gets at solving a task over time. Small amounts of data would yield lower performance. Thus, DL also requires enormous amounts of sample data.

DL has been studied for use in image processing. As an example, an image may be fed to a ML engine implementing a DL algorithm. The ML engine can scan all the pixels within the image to discover edges and shapes that can be used to distinguish between objects in the image. The ML engine can then sort the edges and shapes into a ranked order of possible importance to determine what objects are in the image. The ML engine is not provided with any pre-fed information. Rather, it uses the DL algorithm to determine how many lines the shapes have, whether the lines are connected, and how the lines are connected (e.g., perpendicular or at an angle). Over time, the DL algorithm learns that a circle does not fit in with a square or a triangle. This "thinking" and learning process requires powerful machines to process data generated by the DL algorithm. Accordingly, these machines often reside in data centers to create an artificial neural network that can mimic a human neural network.

A ML engine implementing a DL algorithm can take longer than a typical ML to train because it is learning by example on its own and does not rely on hand-fed data. The amount of time needed to train such a ML engine can depend on the problem that the DL algorithm is tasked to solve. For example, training a ML engine implementing a DL algorithm for translating words spoken in one human language into words written in a different language can take years due to the differences in the overall language, language use, voice pitches, and hardware-based capabilities.

Accordingly, DL usually requires a significant number of training samples and long training time. To this end, embodiments disclosed herein provide a solution to combine the powers of ML and DL by significantly reducing the number of training samples that would be needed to train a ML engine implementing a DL algorithm. In doing so, the time needed to train the ML engine can also be significantly reduced.

In some embodiments, the significant reduction in the number of training samples and time is made possible by transforming text-based documents into images while preserving the main semantic information, leveraging a language knowledge base (e.g., language knowledge base 230 described above). The resulting semantic images can then be input to a ML engine implementing a DL algorithm. This transformation allows for application of image-based DL approaches to document processing such as classification, data extraction, etc.

As explained above, semantic images need not have any textual information. Thus, the ML engine does not need to be trained to recognize textual information (e.g., characters). Rather, the ML engine may only need to be trained on a few hundred to a few thousand images to recognize an "object", "shape", or "geometry" from the semantic images. Here, each such "object", "shape", or "geometry" can represent a piece of coded semantic information.

As described above, in generating a semantic image, text strings associated with an input image are converted into semantic information, which is then coded by semantic types. The coded semantic information is positioned in the semantic image in accordance with geometries associated with the text strings. Following the example above, "July", "31", and "2018" in an input image would be identified and converted semantic information as "month", "day", and "year", which is then coded by a semantic type "date" and positioned in a semantic image in accordance with geometries associated with "July", "31", and "2018". The semantic image thus generated contains an "object", "shape", or "geometry" representing the coded semantic information (also referred to herein as a semantic representation). Instead of having to recognize 148,000 combinations of "July", "31", and "2018", the ML engine now only needs to be trained to recognize one semantic representation of "July", "31", and "2018". This can be a significant reduction in the number of training samples and time required to train the ML engine. Further, because ML engines implementing DL algorithms would run on graphics processing units (GPUs), the processing powers of such ML engines can be increased due to the huge computational power of GPUs.

Based on the semantic representation(s) that the ML engine has learned, the ML engine can determine a document type (classification) and/or find regions of specific objects such as addresses, dates, amounts, etc. (data extraction). In some embodiments, a specifically trained ANN such as an R-CNN can be used.

R-CNN is typically used for image segmentation. More specifically, an R-CNN can be trained to take in an image and correctly identify where the main objects are in the image. This is accomplished by creating bounding boxes (or region proposals), selectively searching the image through windows of different sizes and, for each size, trying to group together adjacent pixels by texture, color, or intensity to identify objects. Once the region proposals are created, the R-CNN forms each proposed region to a standard size box, passes the box through a pre-trained CNN such as the AlexNet, and runs a support vector machine (SVM) to determine what object is in the box (a region proposal). The SVM is configured for classifying whether the region proposal is an object and, if so, what object. Once the region proposal is classified, the R-CNN runs a linear regression model on the region proposal to generate tighter coordinates for the box. The R-CNN then outputs the bounding boxes and labels for each object detected in the image.

A person of ordinary skill in the art understands how to design an R-CNN. Accordingly, R-CNN is not further described herein. Once designed, the parameters for the R-CNN ("R-CNN parameters") are determined by DL. R-CNN parameters are values and coefficients for the R-CNN. Examples of trained neural network parameters can include: number of neurons in the hidden layer, learning rate, momentum, training type, epoch, minimum error, etc.

In the example of FIG. 1, R-CNN runtime engine 140 can leverage the power of R-CNN to detect regions in semantic image 125 by trying to group together adjacent semantic representations by texture, color, intensity, or a semantic coding scheme. For instance, semantic types "street", "city", "state", and "zip code" may be adjacent to one another and are coded in similar textures, colors, or intensities, or within a numerical range. As such, a DL learner (e.g., an R-CNN) may create a region proposal that groups these semantic representations together. An SVM can be configured to identify such a region proposal as an "address". Likewise, a region that has a 1 or 2-digit number, a month, and a four-digit number may be identified as a date.

In some embodiments, regions (e.g., an "address" region, a "date" region, or other regions) in semantic image 125 thus detected by R-CNN runtime engine 140 can be provided as input 155 to text mapping module 150, either alone or in combination with other information (e.g., the text from the document provided to the semantics converter module, or the semantic information generated by the semantics converter module). In some embodiments, text mapping module 150 can be configured for mapping regions identified in input 155 to data structures on a text layer (e.g., text document 115). For example, suppose input 155 is identified as an invoice having regions for an address, an invoice number, an invoice date, a purchase order number, a table header, a table body, and an invoice total. Text mapping module 150 can map these regions to the address, the invoice number, the invoice date, the purchase order number, the table header, the table body, and the invoice total in text document 115. A database can be updated to include text data 160 extracted from the regions. The detection rate and the recognition rate can be at least as good as a rule-based system, but with significantly reduced manual coding and maintenance.

In some embodiments, R-CNN runtime engine 140 may also extract information from semantic image 125 based upon the identified regions (e.g., extracting an address and identifying it as a customer's address, identifying a number as an invoice number, identifying a document type, etc.).

In some embodiments, extracted text 160 can contain well-structured data with data fields (e.g., "address", "invoice number", "invoice date", "purchase order number", "table header", "table body", and "invoice total") and actual content from text document 115. This allows extracted text 160 to be used for further processing by a downstream computing facility or facilities such as a content management system, information management system, database management system, invoice processing system, enterprise resource planning system, etc.

Figure 3:
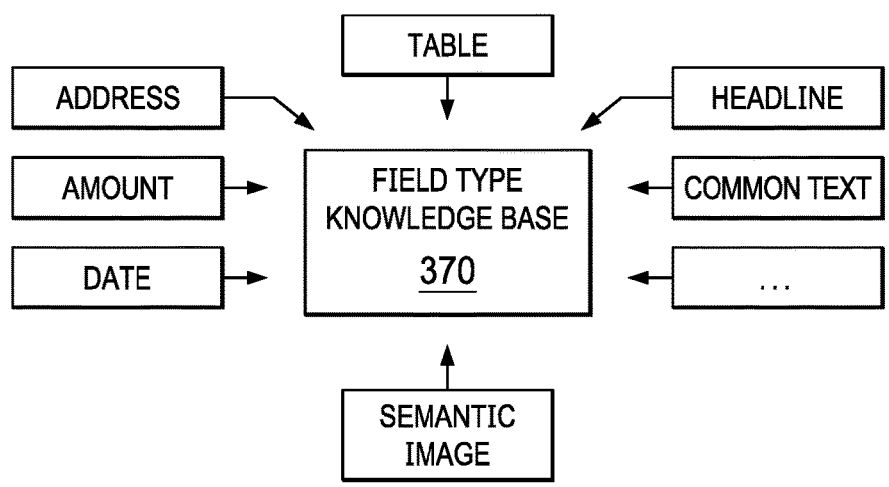
FIG. 3 depicts a diagrammatic representation of a field type knowledge base according to some embodiments.
Figure 4:
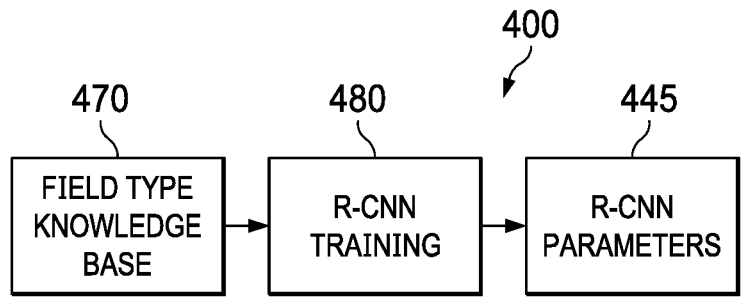
FIG. 4 depicts a flow diagram illustrating an R-CNN training process according to some embodiments.

Knowledge of such fields can come from a field type knowledge base such as one shown in FIG. 3. Unlike a language knowledge base, which can be based on any document type and require no domain-specific or subject-matter knowledge, a field type knowledge base can be configured to contain higher-level, domain-specific knowledge. In the non-limiting example shown in FIG. 3, field type knowledge base 370 is configured for aggregating field-specific reference data in relation to semantic images generated from images of invoices. Accordingly, field type knowledge base 370 can contain information on fields specific to the domain of invoice processing. As illustrated in FIG. 4, field-specific reference data contained in a field type knowledge base (e.g., field type knowledge base 470) can be provided in a training process 400 as input for training R-CNN 480. Trained R-CNN 480 can then output R-CNN parameters 445 which, as described above, can be input to a ML engine (e.g., R-CNN runtime engine 140). The ML engine, in turn, can improve its performance and operation using R-CNN parameters 445.

In some embodiments, the semantic image generated by the semantics converter module described above may also be used by the ML engine (e.g., R-CNN runtime engine 140) to facilitate training of the R-CNN. Typically, training of a ML engine does not utilize a DL feedback loop or semantic image. This is illustrated in a ML training process 500 shown in FIG. 5.

Figure 5:
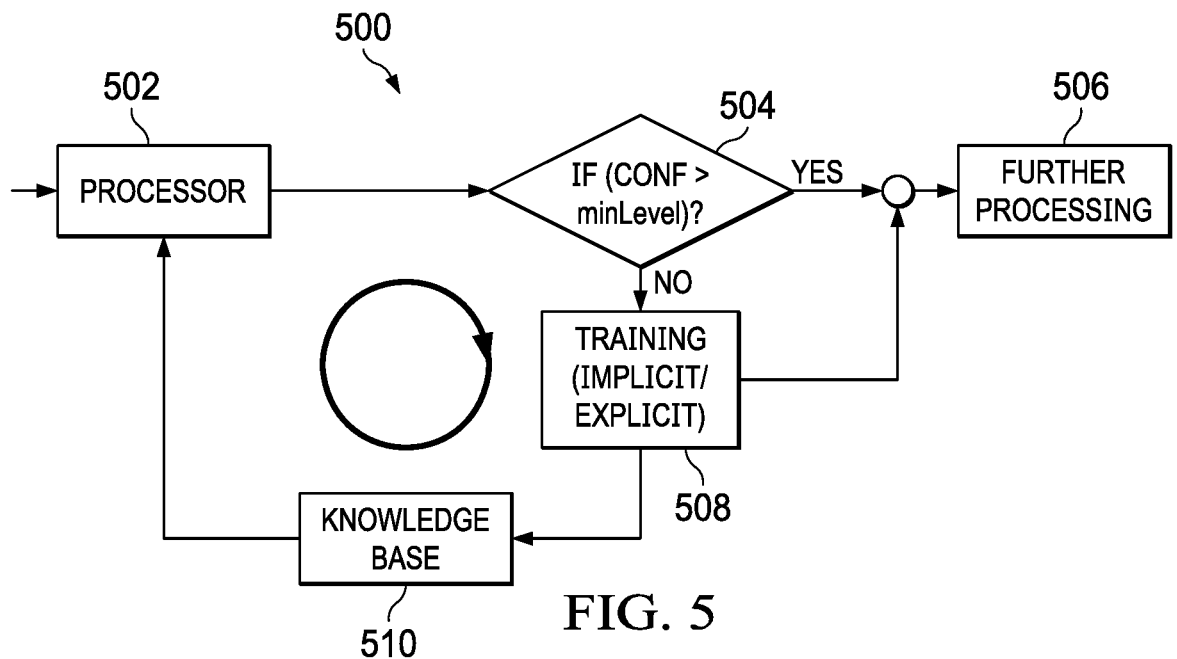
FIG. 5 depicts a diagrammatic representation of a ML training process without a DL feedback loop.

In the example of FIG. 5, a processor 502 (e.g., a ML engine) can output a learned result (e.g., a document classification) and a confidence level for the learned result. If the confidence level meets a minimum threshold (504), the output is provided to a downstream computing facility for further processing (506). Otherwise, the learned result is fed to a training process (508) with explicit or implicit learning (explained below). For example, suppose the minimum threshold is 99% and processor 502 is 98.7% confident that the document classification is correct for an input document. In this case, because the confidence level does not meet the minimum threshold, the learned result is sent to training process 508 so that a knowledge base 510 used by processor 502 can be updated.

As illustrated in FIG. 5, results from a ML engine are typically provided for further processing or used to update a knowledge base. In some embodiments, a ML engine can be enhanced with a DL feedback loop that includes training using semantic images. This is illustrated in FIG. 6.

Figure 6:
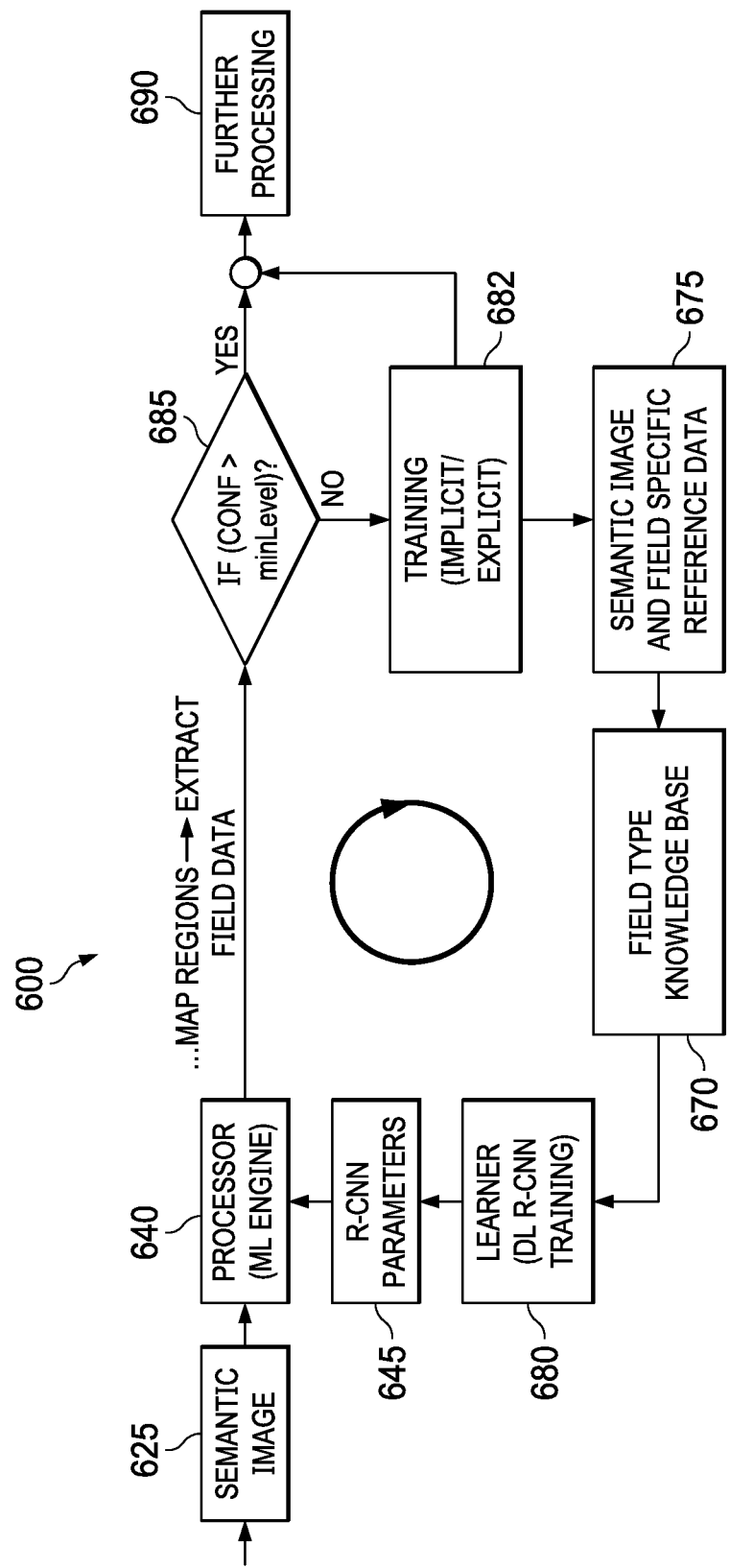
FIG. 6 depicts a diagrammatic representation of a ML training process with a DL feedback loop according to some embodiments.

In the example of FIG. 6, a semantic image 625 is processed by a processor 640 (e.g., a ML engine). Processor 640 can implement an embodiment of R-CNN runtime engine 140 described above. Processor 640 is configured for processing semantic image 625, locating regions of interest, classifying or otherwise identifying regions in semantic image 625, and outputting an R-CNN result and a confidence level (which can be 0-100%). The confidence level is compared with a threshold (685). If the confidence level meets or exceeds the threshold, the R-CNN result is provided to a downstream computing facility for further processing (690). Otherwise, the R-CNN result is sent to a DL feedback loop 600.

In some embodiments, DL feedback loop 600 can include training process 682. In some embodiments, training process 682 can be implicitly or explicitly based on human knowledge. For example, suppose semantic image 625 is generated from an input image of an invoice and a user may be tasked with validating information contained in the invoice. For instance, the user may be tasked with entering and/or validating data in the invoice (e.g., in a workflow). Such a validation can be done, for example, through a single click entry where the user places a pointing device such as a mouse over an address in a document image of the invoice and all the textual information is captured and entered into a form (e.g., a database form, a web form, etc.) which is to be filled out. At this point, the user is creating reference data for DL without knowing that the validation that the user is doing is actually performing this referencing of data. This validation can be a separate process in which all the addresses of all the documents are processed. As described above, for each address, the position information where the address is located on the document is also preserved. This location information can be mapped to the semantic image. Accordingly, unbeknownst to the user, field-specific reference data from the validation can be used in training process 682. This is referred to as implicit training. Unlike implicit training, explicit training is not unsupervised or unattended and the user knows that s/he is part of training process 682. The source of field-specific reference data needs not be a human and can be an enterprise repository where tagged reference data is stored.

Unsupervised learning refers to a ML task of learning a function from the structure of unlabeled data. Many algorithms, including ANNs, can be used for unsupervised learning. Supervised learning refers to a ML task of learning a function that maps an input to an output based on example input-output pairs. This ML task requires labeled training data so that the function can be inferred from the labeled training data. Unsupervised learning and supervised learning are known to those skilled in the art and thus are not further described herein.

In some embodiments, semantic image 625 and field-specific reference data (obtained implicitly or explicitly through training process 682) can be used to update a field type knowledge base 670. Field type knowledge base 670 can implement an embodiment of field type knowledge base 370 described above.

In some embodiments, a learner 680 implementing a DL algorithm can learn from the differences between the actual result (e.g., manually corrected and validated field data for semantic image 625) and the expected result (e.g., the R-CNN result produced by processor 640 from semantic image 625). Because a semantic image is provided to learner 680, the DL algorithm only has to analyze and learn the semantic types in the semantic image, rather than the actual content.

Consider an example in which an ANN is designed to recognize addresses. The ANN must be able to identify all of the potential street addresses, all of the potential cities, all of the potential states, and all of the potential zip codes that might appear in the address. Conventionally, such an ANN would be trained to recognize each of these items separately—an astronomical number of possibilities. However, in the example of FIG. 6, a semantic image, and not a text document, is provided to the R-CNN (in learner 680). Accordingly, the R-CNN only has to be trained to recognize each semantic type in the semantic image. Consequently, the R-CNN only needs to learn a fraction of the possibilities. For instance, instead of learning to recognize all 50 states (in the US alone), the R-CNN only has to be trained to recognize the "state name" semantic type. This greatly reduces the number of examples that are necessary to train the R-CNN, and likewise significantly reduces the amount of time required for the training.

Once trained, learner 680 is operable to output R-CNN parameters 645. This is the output of DL feedback loop 600. As illustrated in FIG. 1, the output from such a DL feedback loop can be fed back into and used by an R-CNN runtime engine. Although the number of layers in an R-CNN is defined initially, the first time when the R-CNN runtime engine is run, there are no such parameters which can be applied. After the R-CNN runtime engine has been running for a while (after collecting data and performing the learning step described above), the R-CNN parameters will be filled and can be applied to the R-CNN runtime engine. Further, the knowledge of the field type knowledge base in terms of the parameters can be applied to the R-CNN runtime engine. In this way, the R-CNN runtime engine can become more powerful over time (e.g., in just one day).

Figure 7:
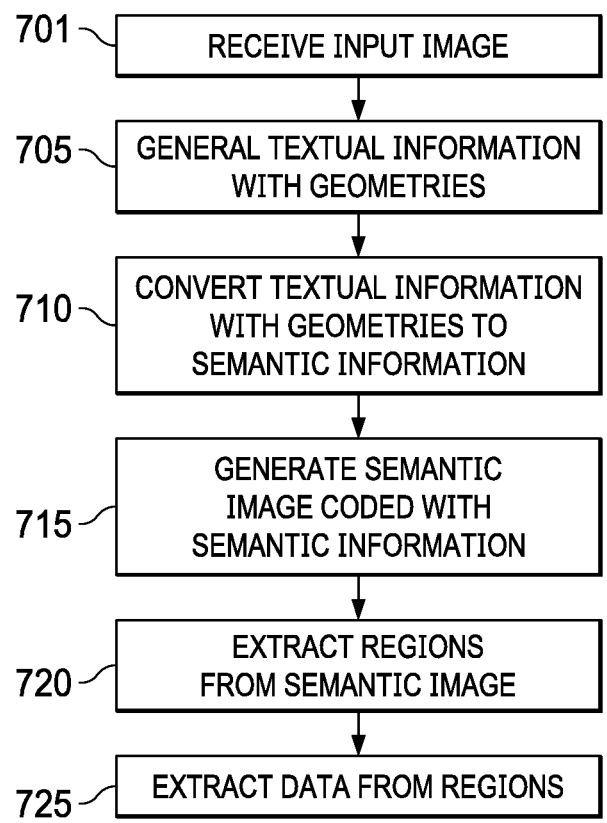
FIG. 7 depicts a flowchart illustrating an exemplary method in accordance with some embodiments.

Referring to FIG. 7, a flowchart illustrating an exemplary method in accordance with some embodiments is shown. In this method, an input image is first received (701). As a non-limiting example, the input image can be a pixel image. In such a case, the pixel image can consist an array of pixels, each of which has a corresponding color or shade of gray. If a corresponding text layer or document does not already exist, the input image is processed, for instance, utilizing an OCR technique, to obtain textual information with geometries from the input image (705). In some cases, a text layer or document may already be provided with the input image. For example, portable document format (PDF) is a file format that can capture all the elements of a printed document as an electronic image. Thus, a PDF file can contain not only images, but also text, interactive buttons, hyperlinks, embedded fonts, video, etc. When viewed by an end user, the text document may look nearly identical to the original input image, although this is not necessary in all embodiments. The text document can include text and geometries, or location information that identifies where in the document the identified text can be found.

Next, semantic information is determined from the textual information (710). In some embodiments, this can involve examining the text document to identify individual character strings within the text and, for each of these individual character strings, accessing a language knowledge base and looking up the semantic type associated with each of the individual character strings.

A semantic image corresponding to the original input image and the corresponding text document can then be generated (715). The semantic image includes the semantic information that was obtained from the language knowledge base. Character strings that have the same semantic type may be considered to be in a single semantic "layer" of the image. For instance, all names of people can be in a "person name" layer, all street names can be a "street name" layer, and so on. The semantic information may be included in the semantic image in a way that is visible to a user, such as color-coding the image to represent the semantic types. Alternatively or additionally, the semantic-type information may be encoded in the document in a way that is not visually representable.

The semantic image can then be provided to a ML engine for processing (720). In some embodiments, the ML engine implements an R-CNN that can learn to extract regions from semantic images as it processes each semantic image, thereby continually improving its own performance. In this case, the R-CNN examines the received semantic image and identifies regions within the semantic image. For example, if the R-CNN detects certain features of the semantic image (e.g., coded semantic information) are in close proximity to each other and are coded similarly or close to each other (e.g., similar colors, shades, intensities, etc.), the R-CNN may group these features as a region for a field, using knowledge (e.g., the field-specific reference data described above) from a field knowledge base. In some cases, if a number-type semantic information is close to a keyword-type semantic information (e.g., "invoice"), the region may be determined to represent a field (or a variable) and its corresponding value (e.g., the keyword "invoice" and the corresponding invoice number).

The regions in the semantic image thus identified can be mapped to the text document and data from the regions can be extracted in from the text document a structured manner (725). The data extracted from the regions can be used to update a database and/or provided to a downstream computing facility for further processing. In the example of an address region, the separate character strings representing the number, street name, city, state, and zip code can be collectively interpreted as a single address, rather than as separate and independent pieces of text. This address may further be interpreted as being associated with a particular person who is identified by nearby character strings having "person name" semantic types.

Figure 8C:
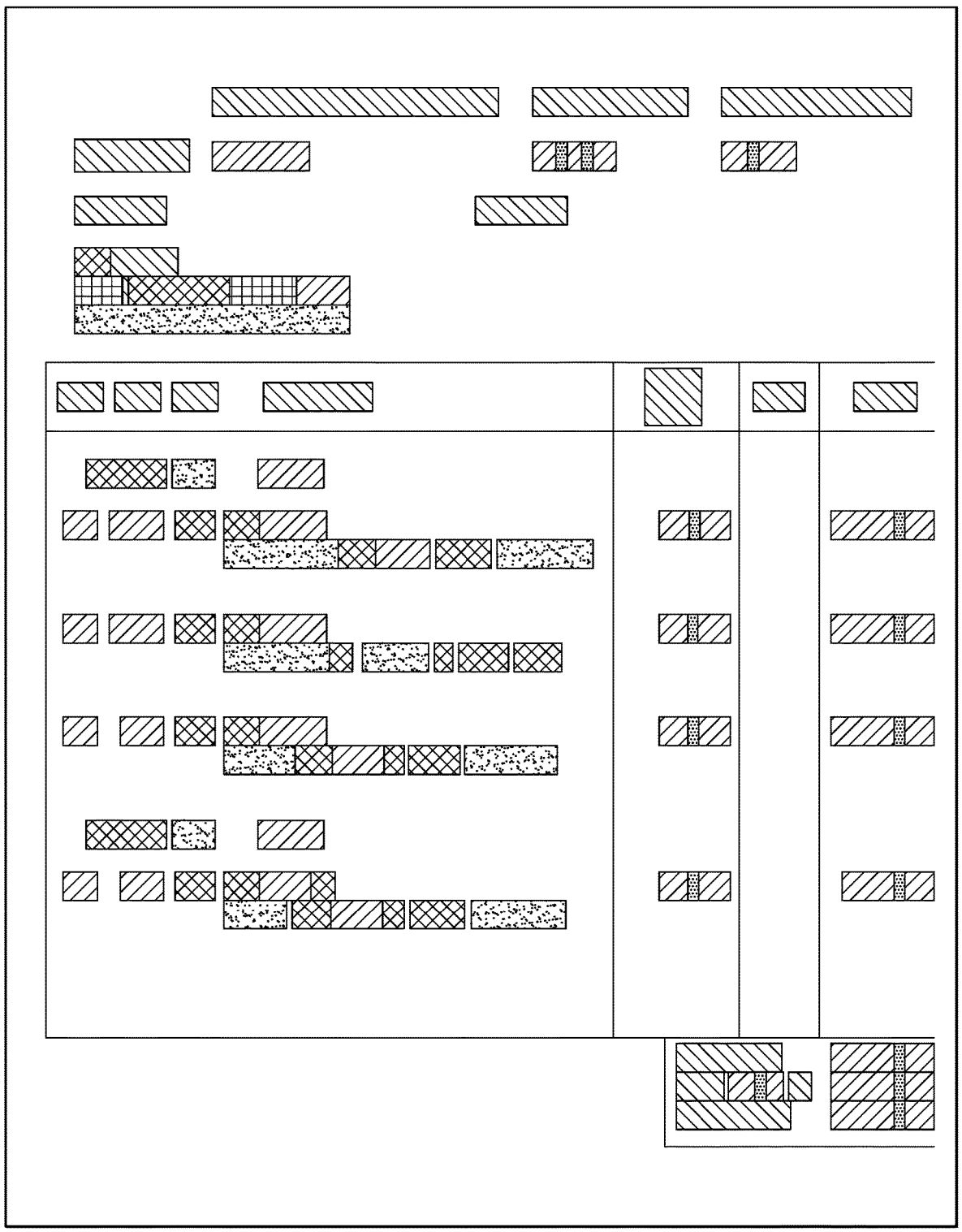
Figure 8D:
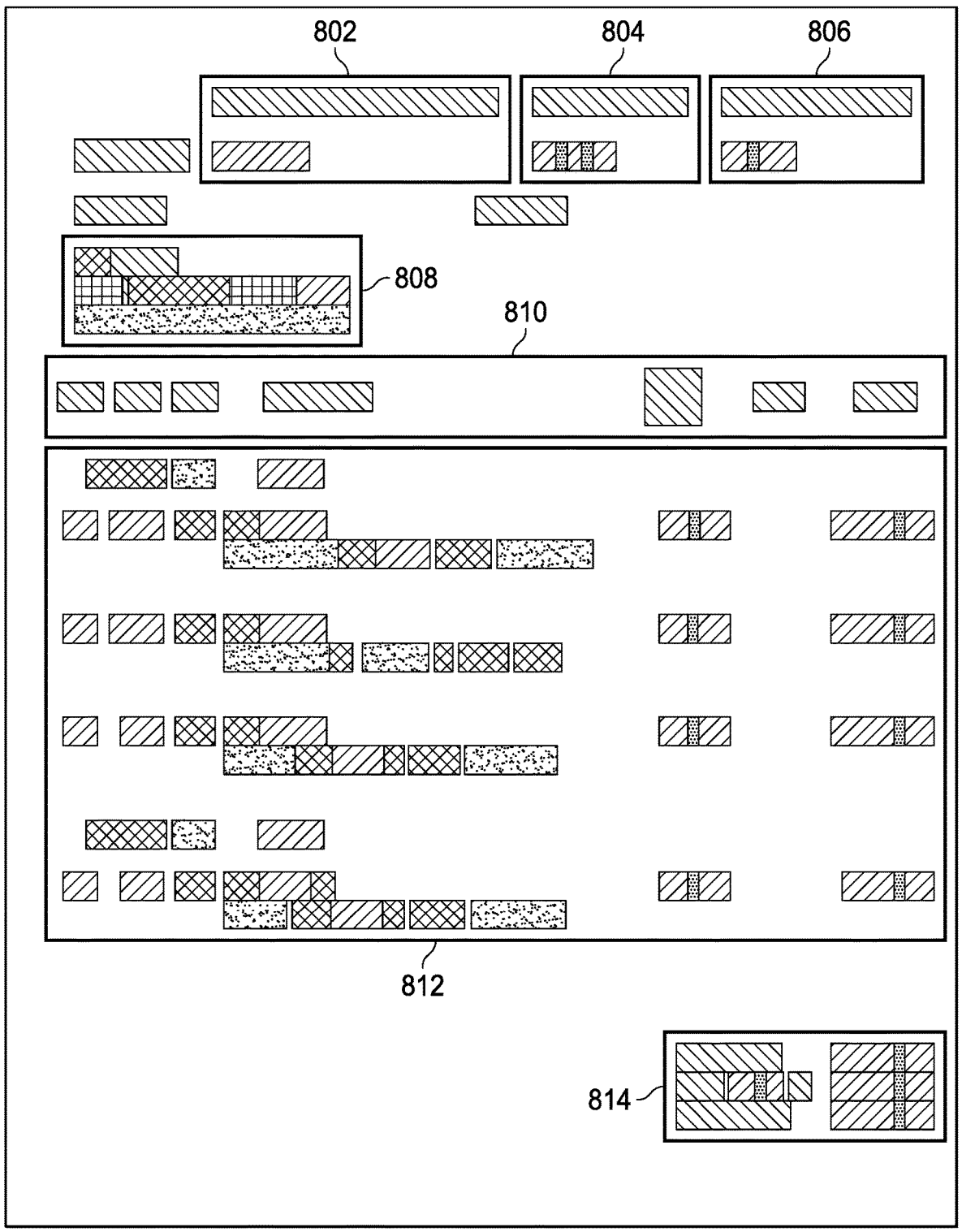

The transformation of an input image to a text document, to a semantic image, then to a document with identified regions is illustrated in FIGS. 8A-8E. FIG. 8A depicts an input image 801 that is provided to a system implementing a method disclosed herein. FIG. 8B depicts a text document 815 that contains text with geometries. FIG. 8C depicts a semantic image 825 with coded semantic information and without textual information (or any graphics or layout information). FIG. 8D depicts an image 835 that overlays the coded semantic information and regions of interest determined by an R-CNN.

In the example of FIG. 8A, input image 801 shows an invoice. If input image 801 is a pixel image, input image 801 would contain image information only—each pixel has a corresponding color or grayscale value, but no textual information other than an image of the text. Such a pixel image could, for example, be captured by scanning or photographing a paper copy of the document.

After the pixel image is processed by an OCR module (e.g., OCR module 110), a text document is produced. FIG. 8B shows an example of text document 815. The text document may be in a variety of formats, such as a PDF file, a Word document, etc. The text document in this example looks nearly identical to the pixel image of FIG. 4A, but the text document contains textual information that is encoded as text, rather than pixels which depict an image of text. In addition to the encoded textual information, the text document includes geometries associated with the text. For example, the character string "INVOICE" is associated with a specific position at the upper left portion of the document, while the character strings "total" and "GBP" are associated with corresponding positions at the lower right portion of the document. The position information (geometries) of the text may or may not be visible to an end user. In the example of FIG. 8B, the position information (e.g., geometrics represented by boxes) is visible for each piece of text (e.g., a character string) in text document 815.

Text document 815 can be processed (e.g., by semantics converter module 120) to identify the semantic information and corresponding semantic types associated with the text in the document. After the semantic types are identified, semantic image 825, which is depicted in FIG. 8C, can be generated as described above. The semantic image shows coded semantic types for the text in the document. As a non-limiting example, semantic image 825 shows a block at the position of each character string. The block can have a color, shade, intensity, texture, or any suitable semantic code corresponding to the semantic type of the character string. For example, the "INVOICE" character string may be determined to be a keyword, so a block that has a shade corresponding to the "keyword" semantic type is displayed in semantic image 825 at the position occupied by the word "INVOICE" in text document 815. The shade corresponding to the "keyword" semantic type may be a particular color, a particular shade of gray, etc. Semantic image 825 can include a block of this same shade at the position of each keyword in the document. Character strings that are associated with each unique semantic type can be represented in semantic image 825 by a block of a particular shade corresponding to this unique semantic type. For example, numeric character strings may be represented by yellow, separators may be represented by red, city names may be represented by blue, and so on.

Again, as described above, semantic image 825 depicted in FIG. 8C can include only the shaded blocks that represent the semantic types of the corresponding character strings. Semantic image 825 does not include the character strings themselves. In alternative embodiments, it is possible to include both the semantic type information and the character strings in a semantic image. The coded semantic information that is provided by semantic image 825 in the example of FIG. 8C is sufficient to allow an R-CNN to identify regions of interest within semantic image 825. For example, the R-CNN can identify the geometric region of character strings that includes a number, street name, city, state, and zip code as an address without having to know the specific street number, street name, city, state, or zip code.

Figure 8E:
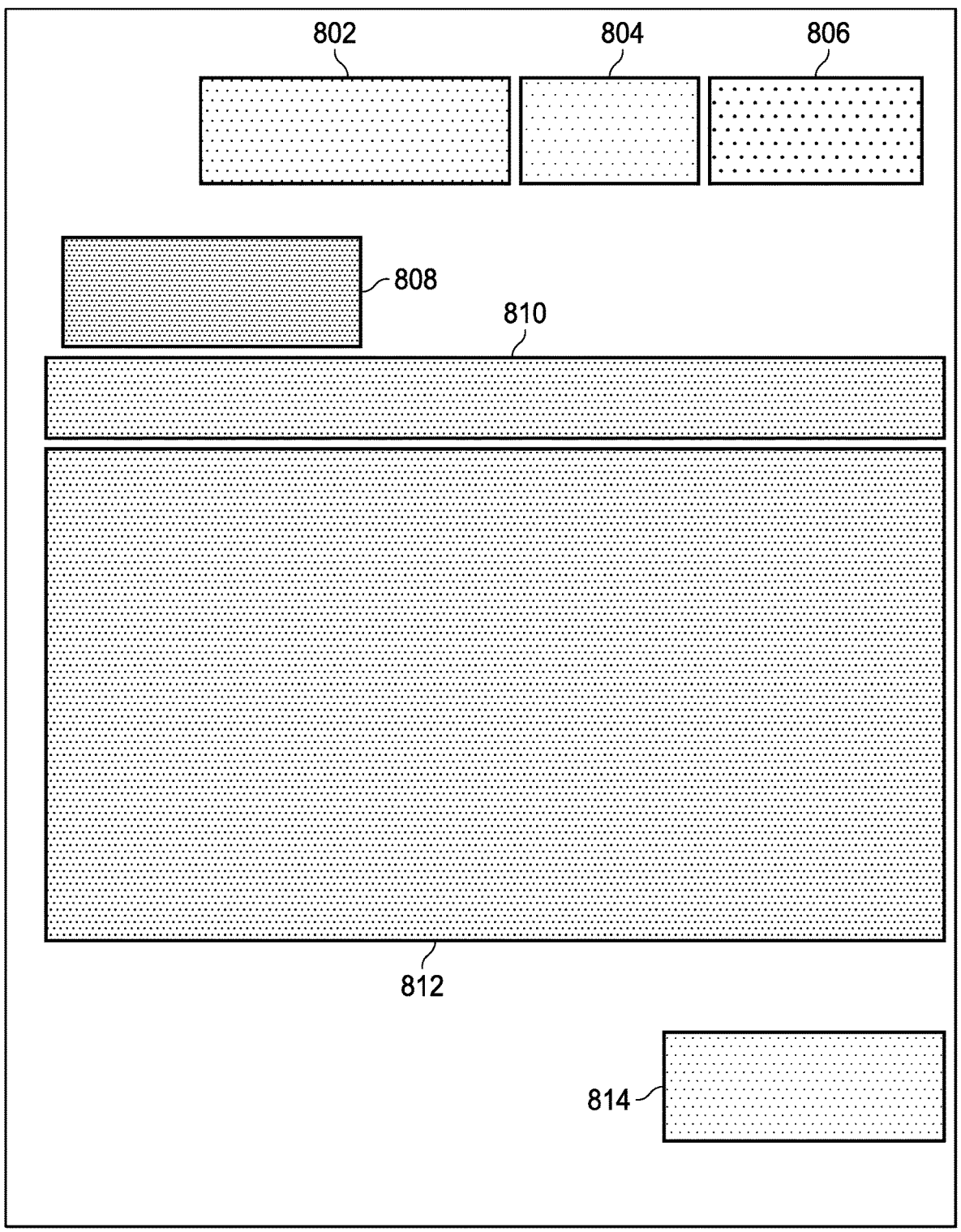

Image 835 shown in FIG. 8D illustrates regions of interest that can be identified by the R-CNN from semantic image 825 shown in FIG. 8C. In this example, these regions include a purchase order number region 802, an invoice number region 804, an invoice date region 806, an address region 808, a table header region 810, a table body region 812, and an invoice totals region 814. While FIG. 8D shows that the identified regions overlay the coded semantic information, this is a visualization and not a programmatic output of the R-CNN. FIG. 8E depicts an example image 855 with just the regions thus extracted.

The solution described above can be usable for document processing, e.g., classification and data extraction. Accordingly, an additional mapping step (e.g., by text mapping module 150 of FIG. 1) can be performed to map the regions to the text in the text document and extract data from their respective regions. Further, the mapping step may include classifying the input image based on the identified regions. For example, purchase order number region 802, invoice number region 804, invoice date region 806, address region 808, table header region 810, table body region 812, and invoice totals region 814 together may indicate that input image 801 is an invoice. Accordingly, the text mapping module may classify input image 801 as an invoice, associate the invoice with the invoice number, the invoice date, and the purchase order number extracted from the invoice, and update a database to include an entry of the invoice, including a customer's name and address, as well as the specific line item descriptions and costs specified in the table body, and the total amount of the invoice.

Figure 9:
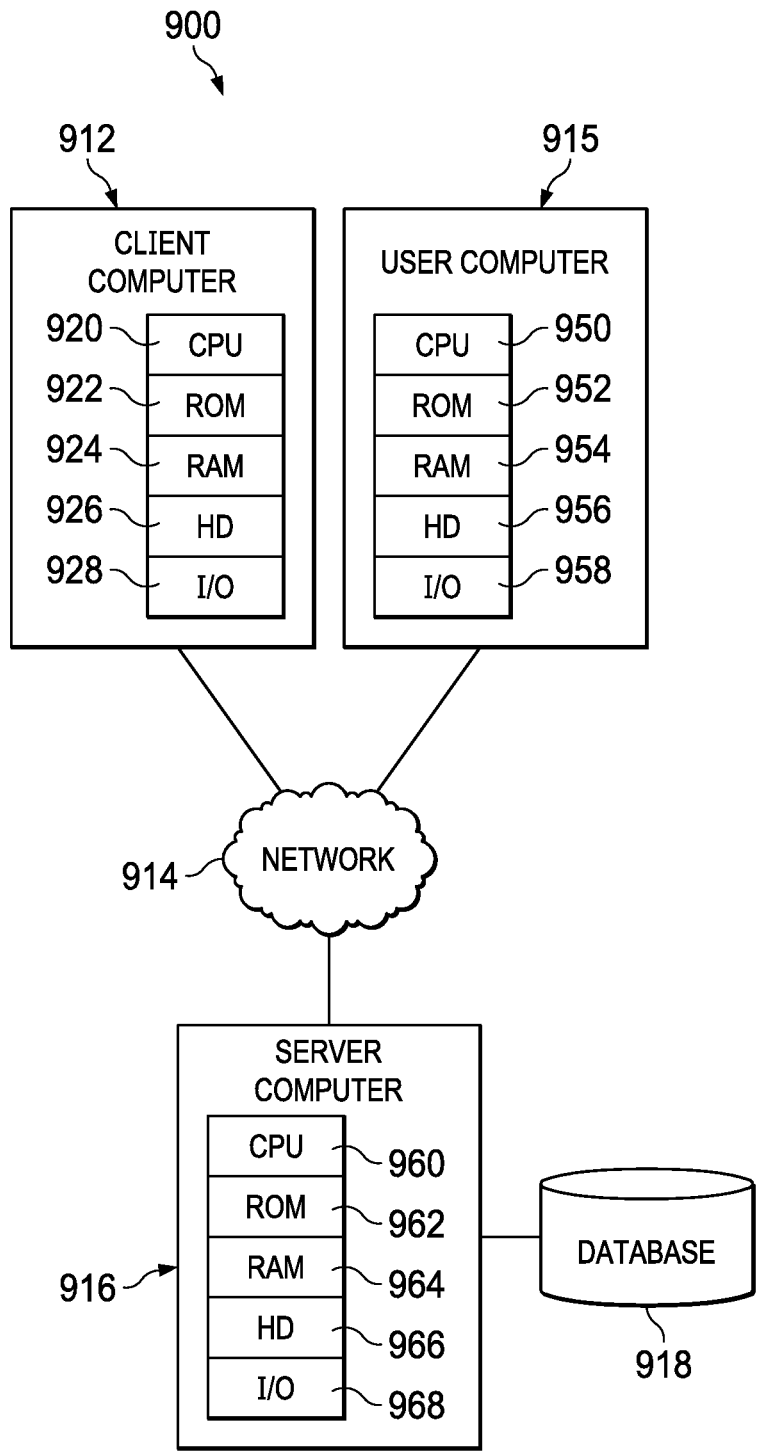
FIG. 9 depicts a diagrammatic representation of a distributed network computing environment where embodiments disclosed can be implemented.

FIG. 9 depicts a diagrammatic representation of a distributed network computing environment where embodiments disclosed herein can be implemented. In the example illustrated, a network computing environment 900 can include a network 914 bi-directionally coupled to a computer 912, a computer 915, and a computer 916. Computer 916 can be bi-directionally coupled to a data store or database 918. Network 914 may represent a combination of wired and wireless networks that network computing environment 900 may utilize for various types of network communications known to those skilled in the art.

For purpose of illustration, a single system is shown for each of computer 912, computer 915, and computer 916. However, with each of computer 912, computer 915, and computer 916, a plurality of computers (not shown) may be interconnected to each other over network 914. For example, a plurality of computers 912 and a plurality of computers 915 may be coupled to network 914. Computers 912 may include data processing systems for communicating with computer 916. Computers 915 may include data processing systems for individuals whose jobs may require them to configure services used by computers 912 in network computing environment 900.

First enterprise computer 912 can include central processing unit ("CPU") 920, read-only memory ("ROM") 922, random access memory ("RAM") 924, hard drive ("HD") or storage memory 926, and input/output device(s) ("I/O") 928. I/O 929 can include a keyboard, monitor, printer, electronic pointing device (e.g., mouse, trackball, stylus, etc.), or the like. Computer 912 can include a desktop computer, a laptop computer, a personal digital assistant, a cellular phone, or nearly any device capable of communicating over a network. Computer 915 may be similar to computer 912 and can comprise CPU 950, ROM 952, RAM 954, HD 956, and I/O 958.

Likewise, computer 916 may include CPU 960, ROM 962, RAM 964, HD 966, and I/O 968. Computer 916 may include one or more backend systems configured for providing a variety of services to computers 912 over network 914. These services may utilize data stored in data store 918. Many other alternative configurations are possible and known to skilled artisans.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912, 915, and 916 is an example of a data processing system. ROM 922, 952, and 962; RAM 924, 954, and 964; HD 926, 956, and 966; and data store 918 can include media that can be read by CPU 920, 950, or 960. Therefore, these types of memories include non-transitory computer-readable storage media. These memories may be internal or external to computers 912, 915, or 916.

Portions of the methods described herein may be implemented in suitable software code that may reside within ROM 922, 952, or 962; RAM 924, 954, or 964; or HD 926, 956, or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time", "offline", in a "batch mode", etc. Portions of processing can be performed at different times and at different locations, by different (or the same) processing systems.

As used herein, the terms "comprises", "comprising", "includes", "including", "has", "having", or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A method comprising:
processing, by a computer, an input image of a document to obtain textual information and geometries of the textual information;
converting, by the computer, the textual information to semantic information utilizing a language knowledge base;
generating, by the computer, a semantic image, the generating comprising positioning the semantic information in the semantic image utilizing the geometries of the textual information;
processing, by the computer utilizing a region-based convolutional neural network (R-CNN), the semantic image, the R-CNN trained for extracting regions from the semantic image for text mapping, each of the regions representing a piece of the semantic information in the semantic image;
mapping, by the computer, the regions extracted from the semantic image to data fields in the document; and
extracting, by the computer utilizing the regions extracted from the semantic image and the geometries of the textual information, data from the data fields in the document.

2. The method according to claim 1, wherein the converting further comprises:
determining a text string from text bounded by each of the geometries of the textual information;
searching the language knowledge base for information on the text string in the textual information;
determining, based on the information contained in the language knowledge base, a semantic type of the text string; and
coding the text string based on the semantic type of the text string.

3. The method according to claim 1, where the processing the semantic image further comprises classifying or identifying a region in the semantic image and outputting an R-CNN result and a confidence level.

4. The method according to claim 3, wherein the processing the semantic image further comprises:
comparing the confidence level with a threshold; and
responsive to the confidence level meeting or exceeding the threshold, providing the R-CNN result to a downstream computing facility.

5. The method according to claim 3, wherein the processing the semantic image further comprises:
comparing the confidence level with a threshold; and
responsive to the confidence level being less than the threshold, providing the R-CNN result to a deep learning feedback loop.

6. The method according to claim 5, wherein the deep learning feedback loop comprises a learner implementing a deep learning algorithm, wherein the deep learning algorithm is adapted for analyzing and learning semantic types in the semantic image.

7. The method according to claim 1, further comprising:
updating a database to include the data extracted from the data fields in the document.

8. A system comprising:
a processor;
a non-transitory computer-readable medium; and
stored instructions translatable by the processor to perform:
processing an input image of a document to obtain textual information and geometries of the textual information;
converting the textual information to semantic information utilizing a language knowledge base;
generating a semantic image, the generating comprising positioning the semantic information in the semantic image utilizing the geometries of the textual information;
processing, utilizing a region-based convolutional neural network (R-CNN), the semantic image, the R-CNN trained for extracting regions from the semantic image for text mapping, each of the regions representing a piece of the semantic information in the semantic image;
mapping the regions extracted from the semantic image to data fields in the document; and
extracting, utilizing the regions extracted from the semantic image and the geometries of the textual information, data from the data fields in the document.

9. The system of claim 8, wherein the converting further comprises:
determining a text string from text bounded by each of the geometries of the textual information;
searching the language knowledge base for information on the text string in the textual information;
determining, based on the information contained in the language knowledge base, a semantic type of the text string; and
coding the text string based on the semantic type of the text string.

10. The system of claim 8, where the processing the semantic image further comprises classifying or identifying a region in the semantic image and outputting an R-CNN result and a confidence level.

11. The system of claim 10, wherein the processing the semantic image further comprises:
comparing the confidence level with a threshold; and
responsive to the confidence level meeting or exceeding the threshold, providing the R-CNN result to a downstream computing facility.

12. The system of claim 10, wherein the processing the semantic image further comprises:
comparing the confidence level with a threshold; and
responsive to the confidence level being less than the threshold, providing the R-CNN result to a deep learning feedback loop.

13. The system of claim 12, wherein the deep learning feedback loop comprises a learner implementing a deep learning algorithm, wherein the deep learning algorithm is adapted for analyzing and learning semantic types in the semantic image.

14. The system of claim 8, wherein the stored instructions are further translatable by the processor to perform:
updating a database to include the data extracted from the data fields in the document.

15. A computer program product comprising a non-transitory computer-readable medium storing instructions translatable by a processor to perform:
processing an input image of a document to obtain textual information and geometries of the textual information;
converting the textual information to semantic information utilizing a language knowledge base;

generating a semantic image, the generating comprising positioning the semantic information in the semantic image utilizing the geometries of the textual information;

processing, utilizing a region-based convolutional neural network (R-CNN), the semantic image, the R-CNN trained for extracting regions from the semantic image for text mapping, each of the regions representing a piece of the semantic information in the semantic image;

mapping the regions extracted from the semantic image to data fields in the document; and extracting, utilizing the regions extracted from the semantic image and the geometries of the textual information, data from the data fields in the document.

16. The computer program product of claim 15, wherein the converting further comprises:

determining a text string from text bounded by each of the geometries of the textual information;

searching the language knowledge base for information on the text string in the textual information;

determining, based on the information contained in the language knowledge base, a semantic type of the text string; and coding the text string based on the semantic type of the text string.

17. The computer program product of claim 15, where the processing the semantic image further comprises classifying or identifying a region in the semantic image and outputting an R-CNN result and a confidence level.

18. The computer program product of claim 15, wherein the processing the semantic image further comprises:

comparing the confidence level with a threshold; and responsive to the confidence level meeting or exceeding the threshold, providing the R-CNN result to a downstream computing facility.

19. The computer program product of claim 15, wherein the processing the semantic image further comprises:

comparing the confidence level with a threshold; and responsive to the confidence level being less than the threshold, providing the R-CNN result to a deep learning feedback loop.

20. The computer program product of claim 19, wherein the deep learning feedback loop comprises a learner implementing a deep learning algorithm, wherein the deep learning algorithm is adapted for analyzing and learning semantic types in the semantic image.

* * * * *